United States Patent [19]

Ikemori

[11] 4,340,279
[45] Jul. 20, 1982

[54] REAR ATTACHMENT LENS

[75] Inventor: Keiji Ikemori, Yokohama, Japan

[73] Assignee: Canon Kabushiki Kaisha, Tokyo, Japan

[21] Appl. No.: 109,172

[22] Filed: Jan. 2, 1980

[30] Foreign Application Priority Data

Jan. 11, 1979 [JP] Japan .................... 54-1920

[51] Int. Cl.$^3$ ............... G02B 9/60; G02B 15/02
[52] U.S. Cl. ........................... 350/422; 350/465
[58] Field of Search ............... 350/412, 422, 465

[56] References Cited

U.S. PATENT DOCUMENTS 3,516,734  6/1970  Schmidt ................ 350/412 X
4,129,359  12/1978  Momiyama ............. 350/422
4,154,508  5/1979  Nakamura ............. 350/422

Primary Examiner—John K. Corbin
Assistant Examiner—Scott J. Sugarman
Attorney, Agent, or Firm—Toren, McGeady & Stanger

[57] ABSTRACT

In order to increase the focal length of a master lens, a lens of negative power is attached at the rear end of the master lens. This rear attachment lens comprises three lens groups of which the first, counting from the front, is of positive power and consists of a negative meniscus lens of forward convexity and a biconvex lens with the confronting surfaces of these lenses forming a divergent air lens. The second lens group is of negative power, and has at least two pairs of divergent cemented surfaces of opposite curvature particularly for the purpose of achieving improvement of the Petzval sum and good correction of astigmatism simultaneously. The third lens group is of positive power and consists of a positive lens and a negative lens.

8 Claims, 12 Drawing Figures

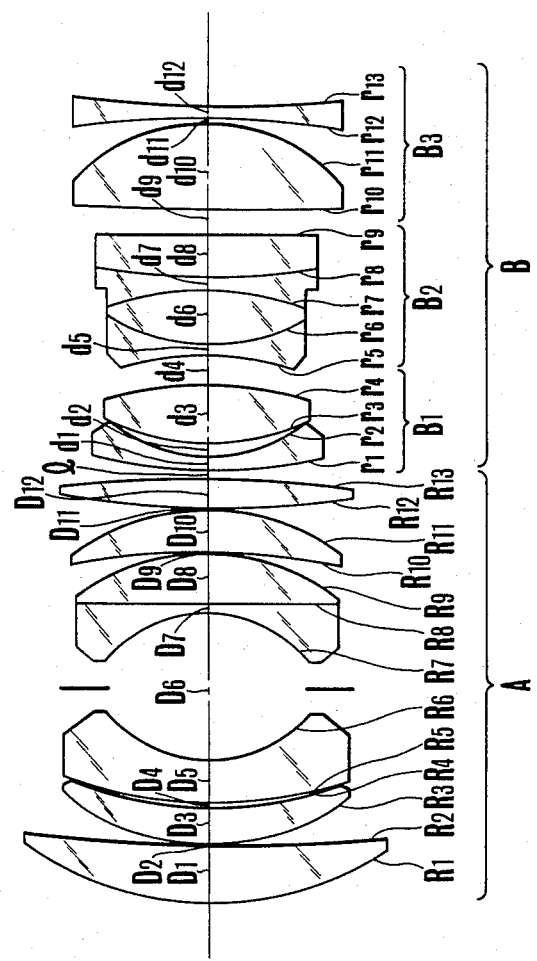
F I G. 3

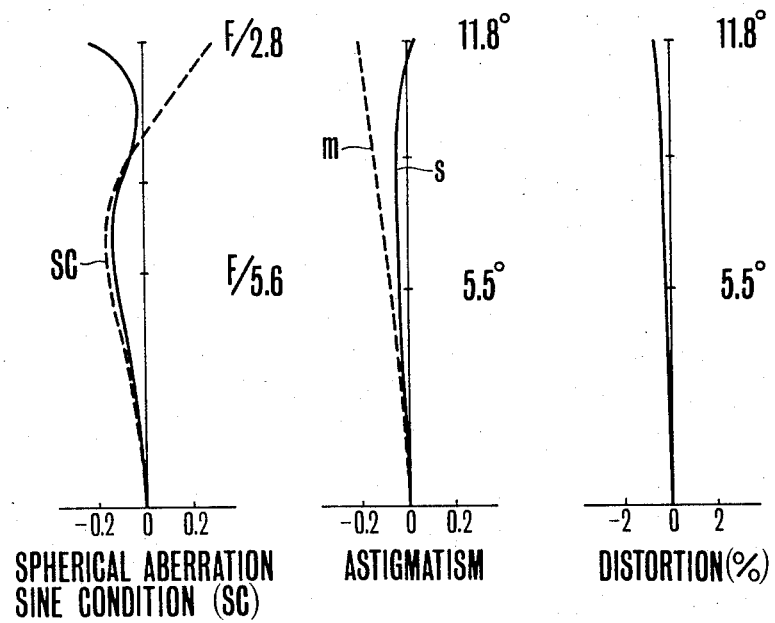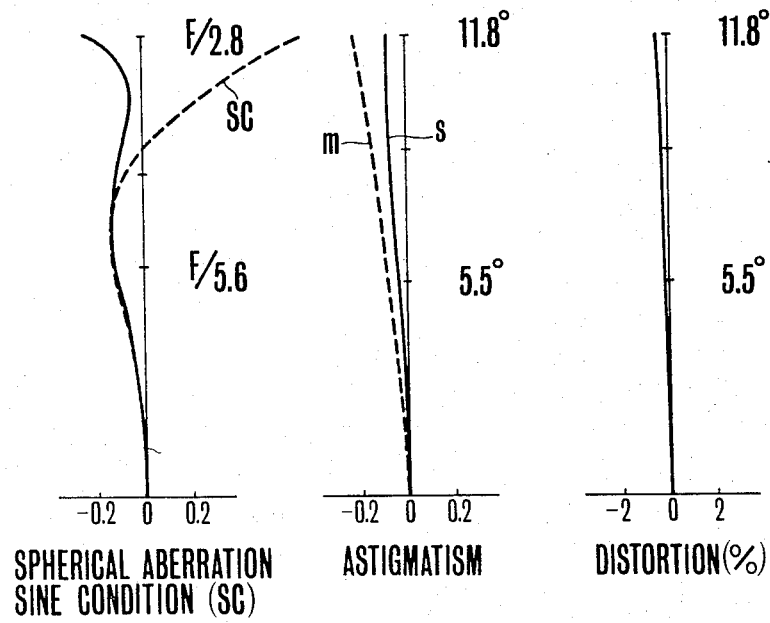

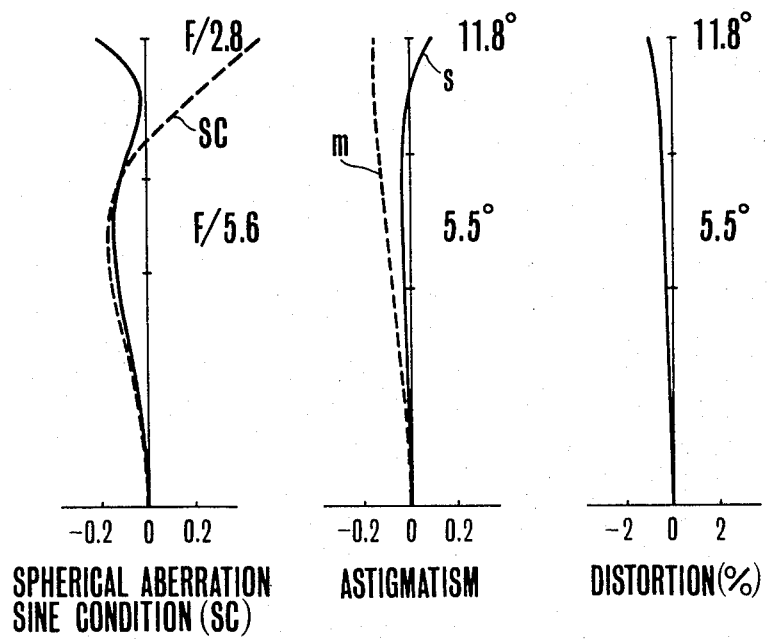

REAR ATTACHMENT LENS

BACKGROUND OF THE INVENTION

This invention relates to an attachment lens inserted between an objective lens and a camera body to increase the focal length of the objective lens.

The use of a lens of negative focal length attached between an interchangeable objective lens and a film plane to increase the focal length of the objective lens has been widely accepted in the single lens reflex camera art, as is known, for example, in U.S. Pat. No. 4,154,508. The assignee of the present invention has proposed an attachment lens in Japanese Patent Publication No. Sho 51-12421, and, later on, this attachment lens after having been expanded to improve the aberrational performance is described in U.S. Pat. No. 4,129,359.

However, whilst such an attachment lens at the rear of the objective lens has merit in that it serves not only to increase the focal length with ease, but also to call for little increase in the bulk and size, it entails the disadvantage that the F-number at full open aperture is increased, that is, the resultant objective system becomes darker. For example, suppose the master lens has a focal length of 50 mm with F-number at full open aperture of 1:2, and the rear attachment lens has a magnifying power of two times, the resultant objective system is simply found to have a focal length of 100 mm with a F-number of 1:4. As the presently most common standard lens is provided with focal length of 50 mm and F 1:1.4, therefore, the usefulness of the 2× rear attachment lens in application to this master lens can be assured when the resultant F-number at full open aperture 1:2.8 is generally regarded as an acceptable value for long lenses.

Ordinary photographic objectives are already corrected for the various aberrations. It is desirable to preserve their high grade imaging performance even after the attachment lens is mounted. To fulfill this requirement, a good aberrational correction of the rear attachment lens itself must be achieved.

However, the rear attachment lens, because of its focal length being negative, has the property of producing a Petzval sum of negative sign. As a counter-measure against this, the lens configuration must be selected so that the front principal point of the rear attachment lens lies as near the master lens as possible, whereby while allowing for an axial separation between the master lens and the attachment lens, the interval between the principal points of these lenses can be shortened to permit the refractive power of the attachment lens to be reduced with the magnifying power remaining unchanged. As a result, the Petzval sum is decreased in the negative sense to prevent deterioration of the curvature of field (astigmatism). A further reduction of the Petzval sum in the negative sense can be achieved by selecting an optical glass of high refractive index for employment in the positive lens elements, and that of low refractive index for employment in the negative lens elements. In connection with the arrangement of the attachment lens and the master lens, however, it should be noted that the diaphragm in the master lens is effective for the attachment lens. Thus, the principal ray of a pencil of off-axial rays does not cross the optical axis when in passing through the attachment lens, as it is laid in either one of the media on the upper and lower sides of the optical axis. Unlike this, the popular types of lenses have diaphragms that are generally located in a space within the lens, so that the principal ray crosses the optical axis at a point within the lens, and so that the aberrations of the upper part from the optical axis and lower part are cancelled out to some extent. This simplifies the expressions for the off-axial aberrations of the master lens. In the attachment lens, the expressions for the off-axial aberrations take a more complicated form.

SUMMARY OF THE INVENTION

It is an object of the present invention to achieve good correction of the Petzval sum, while suppressing the spherical aberration and coma.

Another object is to achieve a large aperture ratio.

To these ends, the attachment lens of negative power is constructed with a positive first lens group counting from the front, a negative second lens group and a positive third lens group, the first lens group being provided with an air lens of divergence formed therein, and the second lens group being provided with at least one pair of divergent cemented surfaces of which the radii of curvature have opposite sign, that is, the curvatures are directed opposite to each other.

The reasons for the above defined lens configuration is as follows. The divergent air lens in the first lens group is advantageous in correcting the spherical aberration. The feature of the second lens group that follows this lens group is most characteristic of the present invention, and by simultaneously taking into account the above described facts that the Petzval sum tends to a negative value, and that the aberrational correction is difficult to perform. One method of shifting the Petzval sum toward positive values, is to increase the refractive powers of the positive and negative lens elements and to select materials of low and high refractive indices from which the positive and negative lens elements are made up respectively. According to this method, the curvatures of the individual lens surfaces are made extremely strong, causing the light rays to run zigzag in passage through the second lens group, and therefore causing the aberrational problem which is difficult even in the ideal system to be made further more difficult. The present invention contemplates the use of positive and negative lens elements cemented together at their adjoining surfaces in the second lens group so that the light rays pass smoothly therethrough while preventing the production of an unduly large aberration. Moreover, the provision of at least two cemented surfaces of which the radii of curvature are made given opposite sign to each other serves to double the function of shifting the Petzval sum to positive side. That is, it makes it possible to achieve an extremely good correction of field curvature without causing the spherical aberration and coma to deteriorate at any rate. The positive lens element in the third lens group is advantageous in astigmatic correction, and it is found that this advantage becomes greatest when it takes a biconvex form.

BRIEF DESCRIPTION OF THE DRAWINGS

FIG. 3 is a lens block diagram of a third embodiment of an attachment lens according to the present invention as associated with the master lens.

FIGS. 4A to 4C are graphic representations of the various aberrations of the first embodiment.

FIGS. 5A to 5C are graphic representations of the various aberrations of the second embodiment.

FIGS. 6A to 6C are graphic representations of the various aberrations of the third embodiment.

DESCRIPTION OF THE PREFERRED EMBODIMENTS

Figure 1:
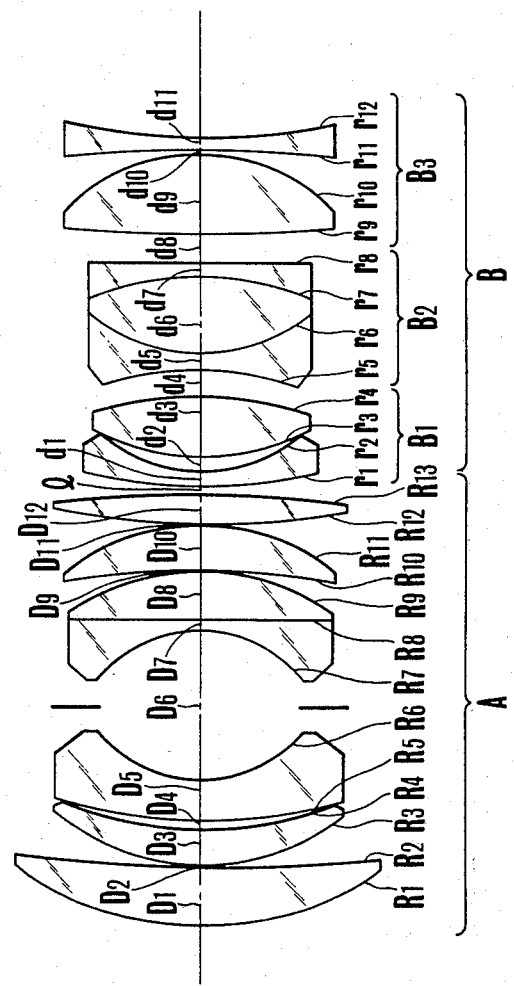
FIG. 1 is a lens block diagram of a first embodiment of an attachment lens according to the present invention as associated with a master lens.
Figure 2:
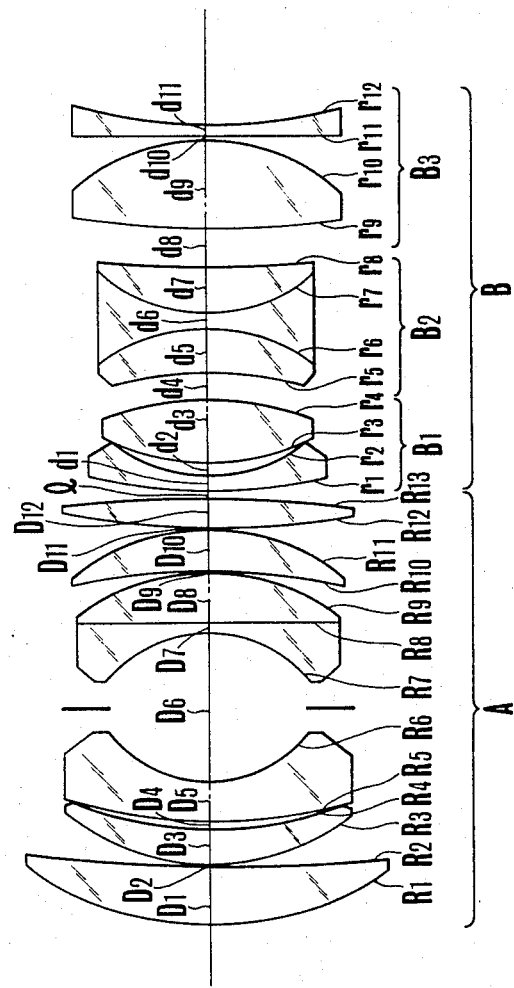
FIG. 2 is a lens block diagram of a second embodiment of an attachment lens according to the present invention as associated with the master lens.

In FIGS. 1 to 3, A is a master lens, and B is an attachment lens. The attachment lens comprises a positive first lens group (B1) counting from the master lens (the front), a negative second lens group (B2) and a positive third lens group (B3). The first lens group consists of a negative meniscus lens of forward convexity, and a biconvex lens. The second lens group has a first surface of forward concavity. The third lens group consists of a positive lens with its rear surface strongly convex toward the rear, and a negative lens. The air space between the negative meniscus lens and the biconvex lens in the first lens group functions as an air lens of divergent action.

The axial space between the first and second lens groups is longer than the thickness of the air lens. The second lens group has cemented lenses with at least one pair of divergent cemented surfaces of which the radii of curvature have signs opposite to each other, and letting D denote the overall axial thickness of the second lens group and Fb the compound focal length of the attachment lens, the following inequality is satisfied.

$$0.12 < (D/|Fb|) < 0.26 \quad (1)$$

The positive and negative lenses in the third lens group may be replaced with each other, and the positive lens may be a doublet.

To achieve a much-desired increase in the relative aperture, it is preferred that the following requirements be fulfilled:

$$0.9 < (r4/r5) < 1.2 \, (r4 < 0, \, r5 < 0) \quad (2)$$

$$0.05 < (|rj|/ri) < 0.24 \, (ri > 0, \, rj < 0) \quad (3)$$

$$0.7 < |\phi s| \cdot |Fb| < 1.3 \quad (4)$$

$$0.35 < |\phi t| \cdot |Fb| < 1.2 \quad (5)$$

wherein
r4 is the radius of curvature of the last lens surface of the first lens group, r5 is the radius of curvature of the first lens surface in the second lens group, ri and rj are the radii of curvature of the front and rear surfaces of the positive lens in the third lens group respectively, and $\phi s$ and $\phi t$ are the sum of the refractive powers of the cemented surfaces convex toward the front, and the sum of the refractive powers of the cemented surfaces convex toward the rear respectively.

Requirement (1) assists in good correction of coma. When the lower limit is exceeded, a significant outward coma is produced, and when the upper limit is exceeded, the lens size is increased.

Requirement (2) represents the ratio of the radius of curvature of the last surface in the first lens group to that of curvature of the first surface in the second lens group determined so as to effect correction of spherical aberration. When the lower limit of this inequality is exceeded, an under-correction will result. When the upper limit is exceeded, an over-correction will result.

Requirement (3) represents the ratio of the radii of curvature of both surfaces of the biconvex shaped positive lens in the third lens group determined so as to effect astigmatic correction. When the lower limit is exceeded, the astigmatism is under-corrected. When the upper limit is exceeded, it is over-corrected, and further the coma deteriorates in this case too.

Requirements (4) and (5) represent the limitation of the refractive powers of the divergent cemented surfaces in the second lens group so that the deterioration of the Petzval sum is prevented despite the large aperture ratio. This makes it possible to correct the various aberrations in good balance.

When the lower limits of the inequalities (4) and (5) are exceeded, the Petzval sum deteriorates. When the upper limit of the inequality (4) is exceeded, the astigmatism will be over-corrected, and the outward coma error becomes unacceptable.

When the upper limit of the inequality (5) is exceeded, the axial thickness of the positive lens having this surface must be greatly thickened with an increase in the size of the lens system.

Both of the longitudinal and lateral chromatic aberrations can be well corrected by using a high dispersion glass in the positive lens element in the first lens group and a low dispersion one in the positive lens element in the third lens group.

The attachment lens of the present invention, in addition to fulfilling the above specific requirements, fulfills the following general requirements:

$$-0.015 < (E1/|Fb|) < 0.025 \quad (I)$$

$$0.1 < E2/|Fb| < 0.27 \quad (II)$$

$$0.18 < \overline{Nn} - \overline{Np} \quad (III)$$

where E1 is the interval between the principal points of the first and second lens groups; E2 is the interval between the principal points of the second and third lens groups; $\overline{Nn}$ is the mean value of the refractive indices of the materials from which the negative lens elements in the attachment lens system are made up; and $\overline{Np}$ is the mean value of the refractive indices of the materials from which the positive lens elements in the attachment lens system are made up.

Requirements (I) and (II) represent the choice of the principal point intervals of the three-component attachment lens so that the front principal point of the attachment lens is shifted toward the front without causing any deterioration in spherical aberration, coma and astigmatism. Thus, the principal point interval between the master lens and the attachment lens can be shortened provided that they do not interfere mechanically when they are to be associated with each other. As a result, the Petzval sum is prevented from deteriorating, and the curvature of field can be limited to a minimum. When the lower limit of the inequality (I), or the upper limit of the inequality (II) is exceeded, an over-correction of spherical aberration, an under-correction of astigmatism, and an inward coma error of large magnitude tend to result, although a further improvement of the Petzval sum is made. Conversely when the upper limit of the inequality (I), or the lower limit of the inequality (II) is exceeded, the Petzval sum tends to deteriorate.

Requirement (III) assists in preventing the deterioration of the Petzval sum by using glass materials of low refractive indices in the positive lens elements and those of high refractive indices in the negative lens elements. When the lower limit is exceeded, it becomes difficult to achieve good correction of the Petzval sum.

Three examples of specific attachment lenses of the invention adapted for use with a master lens having a focal length of 51.6 mm with a F-number of 1.4 can be constructed in accordance with the numerical data given in the following tables. FIGS. 1, 2 and 3 show these three examples of attachment lenses, and FIGS. 4, 5 and 6 each show the spherical aberration, sine condition, astigmatism and distortion of the individual attachment lenses of FIGS. 1, 2 and 3 respectively, when focused at infinity.

An example of a specific master lens common to all the rear attachment lenses may be constructed in accordance with the numerical data given below.

Focal Length (f) = 51.6 mm  F-number (FNo.) = 1.4
Image Angle (2ω) = 45.5

| Radius of Curvature | | Axial Thickness and Air Separation | | Refractive Index | | Abbe Number | |
|---|---|---|---|---|---|---|---|
| $R_1$ | 36.507 | $D_1$ | 6.6 | $N_1$ 1.62041 | | $\nu_1$ 60.3 | |
| $R_2$ | 188.701 | $D_2$ | 0.15 | | | | |
| $R_3$ | 26.228 | $D_3$ | 4.49 | $N_2$ 1.6935 | | $\nu_2$ 53.2 | |
| $R_4$ | 46.022 | $D_4$ | 0.72 | | | | |
| $R_5$ | 59.856 | $D_5$ | 4.49 | $N_3$ 1.58215 | | $\nu_3$ 42.1 | |
| $R_6$ | 14.933 | $D_6$ | 16.82 | | | | |
| $R_7$ | −15.0878 | $D_7$ | 1.03 | $N_4$ 1.7552 | | $\nu_4$ 27.5 | |
| $R_8$ | 763.68 | $D_8$ | 5.99 | $N_5$ 1.6935 | | $\nu_5$ 53.2 | |
| $R_9$ | −24.804 | $D_9$ | 0.15 | | | | |
| $R_{10}$ | −74.82 | $D_{10}$ | 4.59 | $N_6$ 1.8061 | | $\nu_6$ 40.9 | |
| $R_{11}$ | −25.8206 | $D_{11}$ | 0.15 | | | | |
| $R_{12}$ | 107.328 | $D_{12}$ | 3.1 | $N_7$ 1.6935 | | $\nu_7$ 53.2 | |
| $R_{13}$ | −133.878 | | | | | | |

EXAMPLE 1

| Radius of Curvature | | Axial Thickness and Air Separation | | Refractive Index | Abbe Number | |
|---|---|---|---|---|---|---|
| $r_1$ | 57.756 | $d_1$ | 1.3 | $N_1$ 1.6968 | $\nu_1$ 55.5 | |
| $r_2$ | 17.676 | $d_2$ | 1.61 | | | |
| $r_3$ | 26.03 | $d_3$ | 6.6 | $N_2$ 1.5927 | $\nu_2$ 35.3 | |
| $r_4$ | −38.186 | $d_4$ | 2.9 | | | |
| $r_5$ | −35.849 | $d_5$ | 1.5 | $N_3$ 1.7859 | $\nu_3$ 44.2 | |
| $r_6$ | 18.7 | $d_6$ | 9.04 | $N_4$ 1.56732 | $\nu_4$ 42.8 | |
| $r_7$ | −33.745 | $d_7$ | 1.5 | $N_5$ 1.8061 | $\nu_5$ 40.9 | |
| $r_8$ | 1525.98 | $d_8$ | 4.08 | | | |
| $r_9$ | 223.683 | $d_9$ | 9.91 | $N_6$ 1.51633 | $\nu_6$ 64.1 | |

| Radius of Curvature | | Axial Thickness and Air Separation | | Refractive Index | Abbe Number | |
|---|---|---|---|---|---|---|
| $r_{10}$ | −21.284 | $d_{10}$ | 0.15 | | | |
| $r_{11}$ | −189.009 | $d_{11}$ | 1.5 | $N_7$ 1.8061 | $\nu_7$ 40.9 | |
| $r_{12}$ | 74.642 | | | | | |

EXAMPLE 2

| Radius of Curvature | | Axial Thickness and Air Separation | | Refractive Index | | Abbe Number | |
|---|---|---|---|---|---|---|---|
| $r_1$ | 72.903 | $d_1$ | 1.3 | $N_1$ 1.6968 | | $\nu_1$ 55.5 | |
| $r_2$ | 18.055 | $d_2$ | 1.52 | | | | |
| $r_3$ | 25.928 | $d_3$ | 6.6 | $N_2$ 1.5927 | | $\nu_2$ 35.3 | |
| $r_4$ | −35.553 | $d_4$ | 3.06 | | | | |
| $r_5$ | −36.618 | $d_5$ | 5.2 | $N_3$ 1.56732 | | $\nu_3$ 42.8 | |
| $r_6$ | −20.509 | $d_6$ | 1.5 | $N_4$ 1.83481 | | $\nu_4$ 42.7 | |
| $r_7$ | 18.929 | $d_7$ | 5.2 | $N_5$ 1.56732 | | $\nu_5$ 42.8 | |
| $r_8$ | 131.495 | $d_8$ | 4.27 | | | | |
| $r_9$ | 104.558 | $d_9$ | 9.91 | $N_6$ 1.51633 | | $\nu_6$ 64.1 | |
| $r_{10}$ | −20.109 | $d_{10}$ | 0.15 | | | | |
| $r_{11}$ | −668.882 | $d_{11}$ | 1.5 | $N_7$ 1.80610 | | $\nu_7$ 40.9 | |
| $r_{12}$ | 61.709 | | | | | | |

EXAMPLE 3

| Radius of Curvature | | Axial Thickness and Separation | | Refractive Index | | Abbe Number | |
|---|---|---|---|---|---|---|---|
| $r_1$ | 57.991 | $d_1$ | 1.3 | $N_1$ 1.6968 | | $\nu_1$ 55.5 | |
| $r_2$ | 17.663 | $d_2$ | 1.57 | | | | |
| $r_3$ | 25.897 | $d_3$ | 6.6 | $N_2$ 1.5927 | | $\nu_2$ 35.3 | |
| $r_4$ | −38.287 | $d_4$ | 3.14 | | | | |
| $r_5$ | −35.898 | $d_5$ | 1.5 | $N_3$ 1.7859 | | $\nu_3$ 44.2 | |
| $r_6$ | 23.873 | $d_6$ | 6. | $N_4$ 1.56732 | | $\nu_4$ 42.8 | |
| $r_7$ | −32.077 | $d_7$ | 1.5 | $N_5$ 1.8061 | | $\nu_5$ 40.9 | |
| $r_8$ | 81.497 | $d_8$ | 5. | $N_6$ 1.56732 | | $\nu_6$ 42.8 | |
| $r_9$ | 433.12 | $d_9$ | 2.67 | | | | |
| $r_{10}$ | 272.089 | $d_{10}$ | 9.9 | $N_7$ 1.51633 | | $\nu_7$ 64.1 | |
| $r_{11}$ | −21.501 | $d_{11}$ | 0.15 | | | | |
| $r_{12}$ | −111.406 | $d_{12}$ | 1.5 | $N_8$ 1.8061 | | $\nu_8$ 40.9 | |
| $r_{13}$ | 135.806 | | | | | | |

| | Example 1 | Example 2 | Example 3 |
|---|---|---|---|
| Focal Length | −74.266 | −78.561 | −76.872 |
| Separation from Master Lens | 1. | 1. | 1. |
| Magnification Factor | 2 | 2 | 2 |

3rd-Order Aberration Coefficient of Master Lens A and Example 1 Attachment Lens

| | SA | CM | AS | PT | DS |
|---|---|---|---|---|---|
| $R_1$ | 5.337521 | 0.238467 | 0.010654 | 1.082324 | 0.048832 |
| $R_2$ | 0.618531 | −0.880295 | 1.252840 | −0.209392 | −1.485040 |
| $R_3$ | −0.241642 | −0.053377 | −0.011790 | 1.611298 | 0.353317 |
| $R_4$ | 0.746524 | −1.257023 | 2.116618 | −0.918281 | −2.017801 |
| $R_5$ | −1.743458 | 2.053538 | −2.418766 | 0.634394 | 2.101728 |
| $R_6$ | −9.969248 | −1.542130 | −0.238550 | −2.542845 | −0.430250 |
| $R_7$ | −20.261871 | 2.828821 | −0.394940 | −2.942992 | 0.466019 |
| $R_8$ | −0.273295 | −0.224888 | −0.185054 | −0.002805 | −0.154585 |
| $R_9$ | 1.779114 | −0.485607 | 0.132546 | 1.703802 | −0.501229 |
| $R_{10}$ | 0.015328 | −0.037776 | 0.093100 | −0.615615 | 1.287760 |
| $R_{11}$ | 18.725061 | 0.284618 | 0.004326 | 1.783859 | 0.027180 |
| $R_{12}$ | −0.072628 | 0.209977 | −0.607071 | 0.393757 | 0.616719 |
| $R_{13}$ | 6.614944 | −1.129222 | 0.192767 | 0.315674 | −0.0866795 |

-continued

|  | SA | CM | AS | PT | DS |
|---|---|---|---|---|---|
| $r_1$ | −0.408441 | 0.607559 | −0.903749 | 0.733775 | 0.252837 |
| $r_2$ | −8.153976 | −6.637500 | −5.403057 | −2.397584 | −6.349878 |
| $r_3$ | 2.246952 | 2.359835 | 2.478390 | 1.475408 | 4.152431 |
| $r_4$ | 21.877683 | 3.574013 | 0.583863 | 1.005732 | 0.259682 |
| $r_5$ | −20.074809 | −3.722900 | −0.690417 | −1.266814 | −0.362971 |
| $r_6$ | −0.736284 | −0.898887 | −1.097399 | −0.430963 | −1.865888 |
| $r_7$ | −0.840117 | −0.176031 | −0.036884 | −0.257973 | −0.061782 |
| $r_8$ | 0.033727 | −0.125416 | 0.466368 | −0.030184 | −1.621972 |
| $r_9$ | −0.008991 | 0.059117 | −0.388715 | 0.157102 | 1.522956 |
| $r_{10}$ | 6.839253 | 5.474681 | 4.382370 | 1.651037 | 4.829618 |
| $r_{11}$ | −1.557214 | −0.215715 | −0.029882 | −0.243694 | −0.037898 |
| $r_{12}$ | 0.046782 | −0.187047 | 0.747867 | −0.617083 | −0.522908 |
| Total (A + B) | 0.539445 | 0.116812 | 0.055433 | 0.071937 | 0.120082 |

Note:
SA is the spherical aberration coefficient; CM is the coma coefficient; As is the astigmatism coefficient; PT is the Petzval Sum; and DS is the distortion coefficient.

3rd-Order Aberration Coefficient of Example 2 Attachment (Master Lens Holds in the Total)

|  | SA | CM | AS | PT | DS |
|---|---|---|---|---|---|
| $r_1$ | −0.772298 | 0.782996 | 0.793843 | 0.581319 | 0.215468 |
| $r_2$ | −9.033006 | −7.296831 | −5.894354 | −2.347252 | −6.657540 |
| $r_3$ | 2.927041 | 2.960649 | 2.994644 | 1.481195 | 4.527231 |
| $r_4$ | 23.552560 | 4.108177 | 0.716573 | 1.080196 | 0.313403 |
| $r_5$ | −17.149907 | −3.140993 | −0.575271 | −1.020138 | −0.292198 |
| $r_6$ | −5.498840 | −2.118415 | −0.816114 | −0.468054 | −0.494723 |
| $r_7$ | −0.812233 | −1.163987 | −1.668075 | −0.507126 | −3.117216 |
| $r_8$ | 0.000167 | 0.005899 | 0.208802 | −0.284081 | −2.664759 |
| $r_9$ | −0.000581 | −0.009995 | −0.171931 | 0.336089 | 2.823749 |
| $r_{10}$ | 7.197030 | 6.159746 | 5.271962 | 1.747496 | 6.007766 |
| $r_{11}$ | −1.181293 | −0.022021 | −0.000411 | −0.068862 | −0.001291 |
| $r_{12}$ | 0.025544 | −0.146535 | 0.840603 | −0.746415 | −0.540313 |
| Total (A + B) | 0.529063 | 0.123793 | 0.059264 | 0.077545 | 0.345431 |

3rd-Order Aberration Coefficient of Example 3 Attachment (Master Lens Holds in the Total)

|  | SA | CM | AS | PT | DS |
|---|---|---|---|---|---|
| $r_1$ | −0.414302 | 0.611189 | −0.901642 | 0.730794 | 0.252040 |
| $r_2$ | −8.232112 | −6.693686 | −5.442763 | −2.399281 | −6.376515 |
| $r_3$ | 2.311448 | 2.414549 | 2.522250 | 1.482977 | 4.183879 |
| $r_4$ | 21.832653 | 3.541001 | 0.574309 | 1.003053 | 0.255830 |
| $r_5$ | −19.604223 | −3.637962 | −0.675095 | −1.265078 | −0.360039 |
| $r_6$ | −0.159900 | −0.240417 | −0.361476 | −0.337569 | −1.051041 |
| $r_7$ | −1.132577 | −0.232717 | −0.047818 | −0.271380 | −0.065587 |
| $r_8$ | 0.000682 | 0.004285 | 0.026939 | −0.106817 | −0.502194 |
| $r_9$ | 0.013623 | −0.072832 | 0.389380 | −0.086247 | −1.620639 |
| $r_{10}$ | −0.008277 | 0.055391 | −0.370696 | 0.129153 | 1.616512 |
| $r_{11}$ | 6.208478 | 4.965116 | 3.970760 | 1.634359 | 4.482591 |
| $r_{12}$ | −1.666532 | −0.353220 | −0.074865 | −0.413445 | −0.103497 |
| $r_{13}$ | 0.119730 | −0.247932 | 0.513409 | −0.339162 | −0.360826 |
| Total (A + B) | 0.543569 | 0.117867 | 0.069368 | 0.054536 | 0.576368 |

The numerical values of the factors defined in the above requirements are as follows:

|  | Example 1 | Example 2 | Example 3 |
|---|---|---|---|
| $D/|Fb|$ | 0.162 | 0.1515 | 0.1821 |
| $r_4/r_5$ | 1.0652 | 0.9709 | 1.0666 |
| $|rj|/ri$ | 0.0952 | 0.1923 | 0.0790 |
| $|\phi s| \cdot |Fb|$ | 0.8681 | 1.1362 | 0.9291 |
| $|\phi t| \cdot |Fb|$ | 0.5255 | 1.0246 | 0.5722 |
| $E_1/|Fb|$ | 0.0071 | 0.0157 | 0.0131 |
| $E_1/|Fb|$ | 0.1911 | 0.1609 | 0.1903 |

-continued

|  | Example 1 | Example 2 | Example 3 |
|---|---|---|---|
| $\overline{N}n-\overline{N}p$ | 0.21494 | 0.21832 | 0.2121 |

What is claimed is:

1. An attachment lens for use at the rear of a master lens, comprising:
a first lens group of positive power including a negative meniscus lens means and a positive lens means with a diverging air lens between said negative meniscus lens means and said positive lens means;
a second lens group arranged rearwardly of said first lens group, having a negative power, and including two pairs of diverging cemented surfaces whose radii of curvature are of opposite sign to each other; and a third lens group arranged rearwardly of said second lens group, having a positive power and having a positive lens means and a negative lens means, the compound power of said first, said second, and said third lens groups being negative.

2. An attachment lens as in claim 1, wherein letting D denote the axial length of a cemented lens in said second lens group, and Fb the compound focal length of the attachment lens, $$0.12 < (D/|Fb|) < 0.26$$

is satisfied.

3. An attachment lens as in claim 1, wherein said first lens group comprises, from front to rear, a negative meniscus lens of forward convexity and a biconvex lens, and the frontmost surface of said second lens group is concave toward the front.

4. An attachment lens as in claim 3, wherein said second lens group consists of a negative lens, a biconvex lens and a negative lens cemented together successively at their adjoining surfaces.

5. An attachment lens as in claim 3, wherein said second lens group consists of a positive lens, a biconcave lens and a positive lens cemented together successively at their adjoining surfaces.

6. An attachment lens as in claim 3, wherein said second lens group consists of a negative lens, a biconvex lens, a negative lens and a positive lens cemented together successively at their adjoining surfaces.

7. An attachment lens as in claim 1, wherein the axial separation between said first lens group and said second lens group is longer than the axial thickness of said air lens.

8. An attachment lens as in claim 1, wherein said first lens group consists of a negative meniscus lens of forward convexity and a biconvex lens in this order from the front, said second lens group has a frontmost surface concave toward the front and consists of a cemented lens of at least three lens elements, said third lens group consists of a biconvex lens and a negative lens, and the following requirements are fulfilled:

$$0.12 < (D/|Fb|) < 0.26$$

$$0.9 < (r_4/r_5) < 1.2 \ (r_4 < 0, \ r_5 < 0)$$

$$0.05 < (|r_j|/r_i) < 0.24 \ (r_i > 0, \ r_j < 0)$$

$$0.7 < |\phi_s| \cdot |Fb| < 1.3$$

$$0.35 < |\phi_t| \cdot |Fb| < 1.2$$

wherein Fb is the compound focal length of the attachment lens; D is the axial length of the above described cemented lens; $r_4$ is the radius of curvature of the rear surface of the biconvex lens in said first lens group, $r_5$ is the radius of curvature of the front surface of the above described cemented lens; ri and rj are the radii of curvature of the front and rear surfaces of the biconvex lens in the third lens group respectively; and $\phi s$ and $\phi t$ are the sums of the refractive powers of the diverging cemented surfaces convex toward the front and of the diverging cemented surfaces concave toward the front in the second lens group respectively.

* * * * *